United States Patent [19]

Steckler et al.

[11] 4,292,654
[45] Sep. 29, 1981

[54] DEFLECTION SYSTEM AND SWITCHED-MODE POWER SUPPLY USING A COMMON RAMP GENERATOR

[75] Inventors: Steven A. Steckler, Clark; Alvin R. Balaban, Lebanon, both of N.J.

[73] Assignee: RCA Corporation, New York, N.Y.

[21] Appl. No.: 105,503

[22] Filed: Dec. 20, 1979

[51] Int. Cl.[3] .................. H04N 5/04; H04N 3/18
[52] U.S. Cl. .................. 358/158; 358/190; 315/411
[58] Field of Search .......... 358/148, 158, 159, 19 D; 315/411, 408

[56] References Cited

U.S. PATENT DOCUMENTS

| | | | |
|---|---|---|---|
| 3,767,960 | 10/1973 | Ahrens | 315/27 TD |
| 3,832,595 | 8/1974 | Dietz | 315/27 TD |
| 3,928,787 | 12/1975 | Geiger | 315/379 |
| 3,970,780 | 7/1976 | Minoura | 315/411 |

OTHER PUBLICATIONS

Mills, "A Five-Function IC for Television Receivers", *IEEE Trans.* on BTR, Oct. 1969, vol. BTR-15, No. 3, pp. 277-284.

Bissinger, "Stabilisiertes Netzteil für die Horizontal--End Stufe", *Funkschau*, 1970, No. 11, pp. 363-366.

*Primary Examiner*—John C. Martin
*Attorney, Agent, or Firm*—P. J. Rasmussen; W. H. Meagher; W. B. Yorks, Jr.

[57] ABSTRACT

A television horizontal deflection system and a switched-mode power supply are provided which share a single sawtooth waveform generator for the generation of delayed deflection signals and delayed power supply gating signals, respectively. The sawtooth waveform generator has an input coupled to receive pulses which are maintained in phase and frequency synchronism with the sync pulses of the video signal. The sawtooth waveform is applied to a comparator in the horizontal deflection system where it is compared with a D.C. voltage resulting from the phase comparison of the sync and flyback pulses to determine the time of delayed generation of the succeeding horizontal deflection signals. The sawtooth waveform is also applied to a comparator in the power supply to determine the time of delayed generation of the succeeding gating signals for the SCR or like device. By selecting a time constant for the phase adjustment between sync and flyback in the deflection system which is smaller (i.e., faster) than the time constant of the regulated supply, the phase differences between sync and flyback are so quickly compensated for by the deflection system that their effects on the regulated supply are minimized.

10 Claims, 3 Drawing Figures

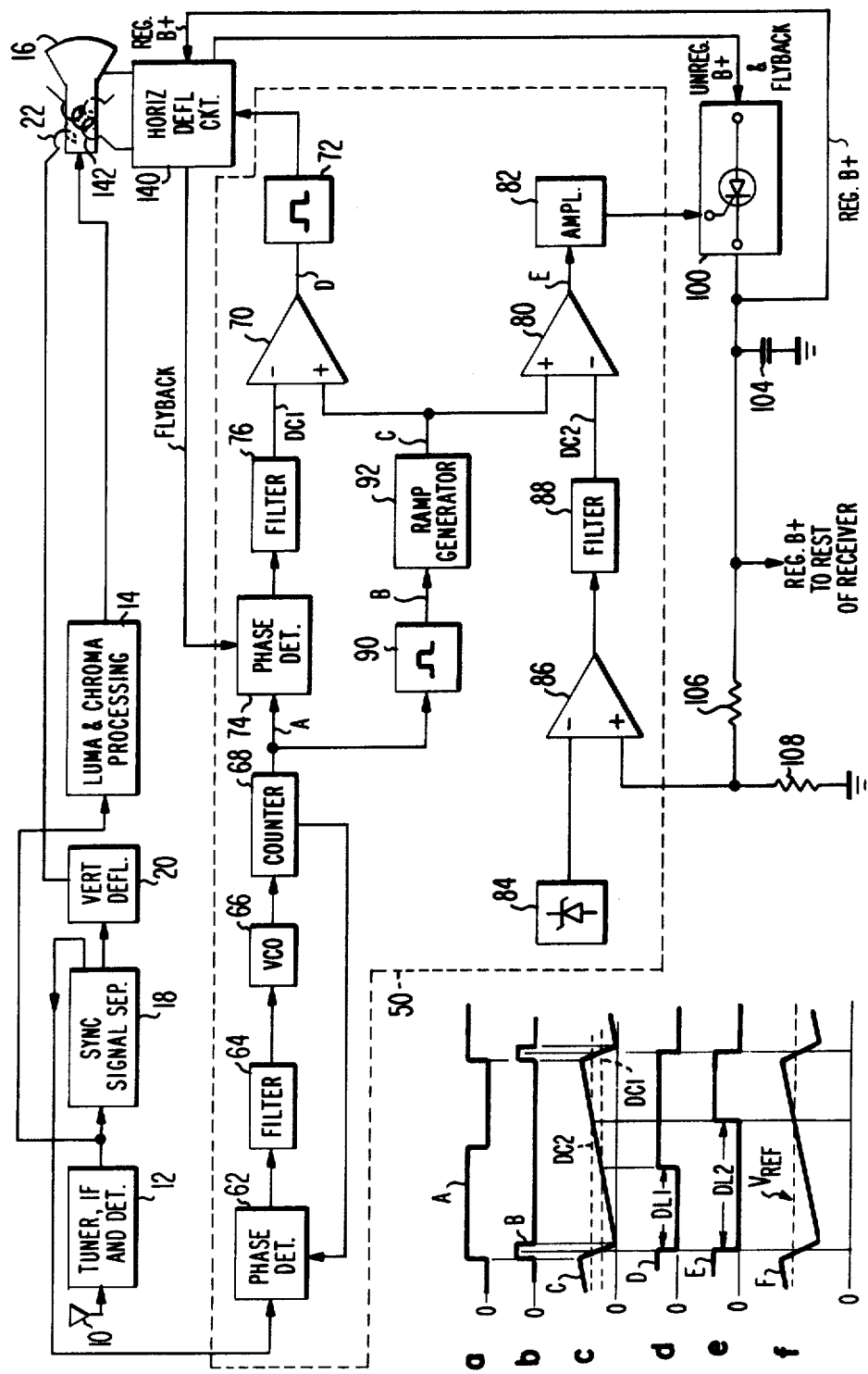

DEFLECTION SYSTEM AND SWITCHED-MODE POWER SUPPLY USING A COMMON RAMP GENERATOR

This invention relates to television deflection and voltage regulator circuits, and more particularly, to the use of a common ramp generator for the generation of a delayed drive pulse for the deflection system and for the generation of a delayed gating pulse for a switched-mode power supply.

Television receivers conventionally include circuitry which develops deflection signals in response to sync signals contained in the composite video signal. It is generally desirable to maintain the deflection signals and the resultant scanning intervals in phase and frequency synchronism with the received sync signals; however, this synchronism may be upset by varying dynamic conditions in the deflection system. For instance, beam current changes in the kinescope and power supply fluctuations can cause the horizontal scanning interval to vary in time duration. The horizontal deflection system can monitor these variations by, for instance, detecting the timing of the flyback pulse during the retrace interval. The horizontal scanning interval variations can then be compensated by controlling the time of generation of the succeeding horizontal deflection signal, thereby bringing the scanning interval back into phase and frequency synchronism with the sync signals.

One technique for controlling the generation of the horizontal deflection signals is to compare the time of occurrence of the sync signals with that of the flyback pulses. The phase difference between these two signals can be indicated by a D.C. voltage level. The sync signal is also used to develop a ramp, or sawtooth waveform, which is representative of the duration of a scanning interval which is locked in phase and frequency to the sync signal. The D.C. voltage level resulting from the phase comparison is then compared with the sawtooth waveform to determine the time of generation of the succeeding horizontal deflection signal. Thus, the D.C. voltage level will vary in accordance with variations in the scanning interval duration, and the delayed generation of the deflection signal will be advanced or retarded to compensate for the scanning interval variations. Phase and frequency synchronism between the sync signals and the scanning intervals is thereby maintained.

Television receivers also include means, such as a switched-mode power supply, for providing regulated voltages to the deflection and other circuits in the receiver. One form of such a power supply uses a device such as a silicon controlled rectifier (SCR) which is connected to a source of unregulated voltage and is gated on by a regulator circuit and commutated off by the flyback pulse. The voltage supplied by the SCR is filtered and is available as a regulated source of voltage. The regulated voltage is sampled and compared to a known reference voltage to develop a voltage level indicative of the difference between the actual and desired levels of the regulated voltage. The difference voltage level is then compared with a ramp, or sawtooth waveform, which is phase locked to the flyback pulses and therefore representative of the periodicity of the flyback pulses. The comparison results in the production of a delayed gating signal which is used to gate on the SCR for some time duration prior to the time that the flyback pulse commutates the SCR off. The comparison between the sawtooth waveform and the difference voltage level therefore determines the duty cycle of the SCR between flyback pulses. By advancing or retarding the timing of the delayed gating signal, the regulated voltage is maintained at its desired level. A gate turn-off device or a conventional transistor may, if desired, be used in place of the SCR, since the delayed gating signal can be produced as a pulse width modulated signal which is suitable for controlling these devices.

It may be seen that both the horizontal deflection system and the switched-mode power supply use a sawtooth waveform for the delayed generation of control signals. But, as discussed above, the horizontal deflection system sawtooth waveform is locked in phase and frequency to the sync signal, whereas the regulator sawtooth waveform is phase locked to the flyback pulses. The deflection system sawtooth waveform is usually derived by integrating the sync signals, and the regulator sawtooth waveform is generated by integrating the flyback pulses. Two separate integrating circuits are therefore required to develop these two sawtooth waveforms.

In accordance with the principles of the present invention, a horizontal deflection system and a switched-mode power supply are provided which share a single sawtooth waveform generator for the generation of delayed deflection signals and delayed power supply gating signals, respectively. The sawtooth waveform generator has an input coupled to receive pulses which are maintained in phase and frequency synchronism with the sync pulses of the video signal. The sawtooth waveform is applied to a comparator in the horizontal deflection system where it is compared with a D.C. voltage resulting from the phase comparison of the sync and flyback pulses to determine the time of delayed generation of the succeeding horizontal deflection signal. The sawtooth waveform is also applied to the second comparator in the power supply to determine the time of delayed generation of the succeeding gating signals for the SCR or like device.

In an illustrative embodiment of the present invention, the regulated voltage of the power supply is used as a source of supply voltage for the horizontal deflection system and many of the signal processing circuits in the television receiver. The regulated supply voltage will be affected by these circuits as their loading on the supply changes, and the power supply will respond to these changes by adjusting the conduction time of the SCR to compensate for them. As discussed above, the phase relationship between the sync and flyback pulses will change due to such factors as beam current loading and power supply fluctuations. Since the SCR is commutated off by the flyback pulses, and is gated on in timed relationship to the sync-locked sawtooth waveform, it might be expected that the changing phase of the flyback pulses would adversely affect the operation of the regulated supply. However, it has been found that these effects will be compensated by the regulated supply just as the effects of loading changes are compensated. In some instances, the effects of circuit loading on the power supply are in fact directly offset by changes in the phase of the flyback signal. Furthermore, it has been discovered that, by selecting a time constant for the phase adjustment between sync and flyback in the deflection system which is smaller (i.e., faster) than the time constant of the regulated supply, the phase differences between sync and flyback are so quickly compensated for by the deflection system that their effects on the regulated supply are minimized. Thus, the lower speed regulator will perceive the sync and flyback signals, and hence the sync-derived sawtooth waveform and flyback signals, as being in a substantially constant phase relationship, thereby permitting satisfactory operation of the combination of the present invention.

The use of a single sawtooth waveform generator in accordance with the present invention is particularly advantageous when portions of the horizontal deflection system and the regulated power supply are manufactured in integrated circuit form on a single integrated circuit chip. The need for only one sawtooth waveform generator simplifies the complexity of the chip circuitry and minimizes the area required for these systems on the chip. The single waveform generator also reduces the number of integrated circuit pins required for connection to external components, such as capacitors.

In the drawing:

FIG. 1 illustrates, partially in block diagram form and partially in schematic diagram form, a horizontal deflection system and a switched-mode power supply constructed in accordance with the principles of the present invention;

FIG. 2 illustrates waveforms which describe the operation of the circuits of FIGS. 1 and 3.

Figure 3:
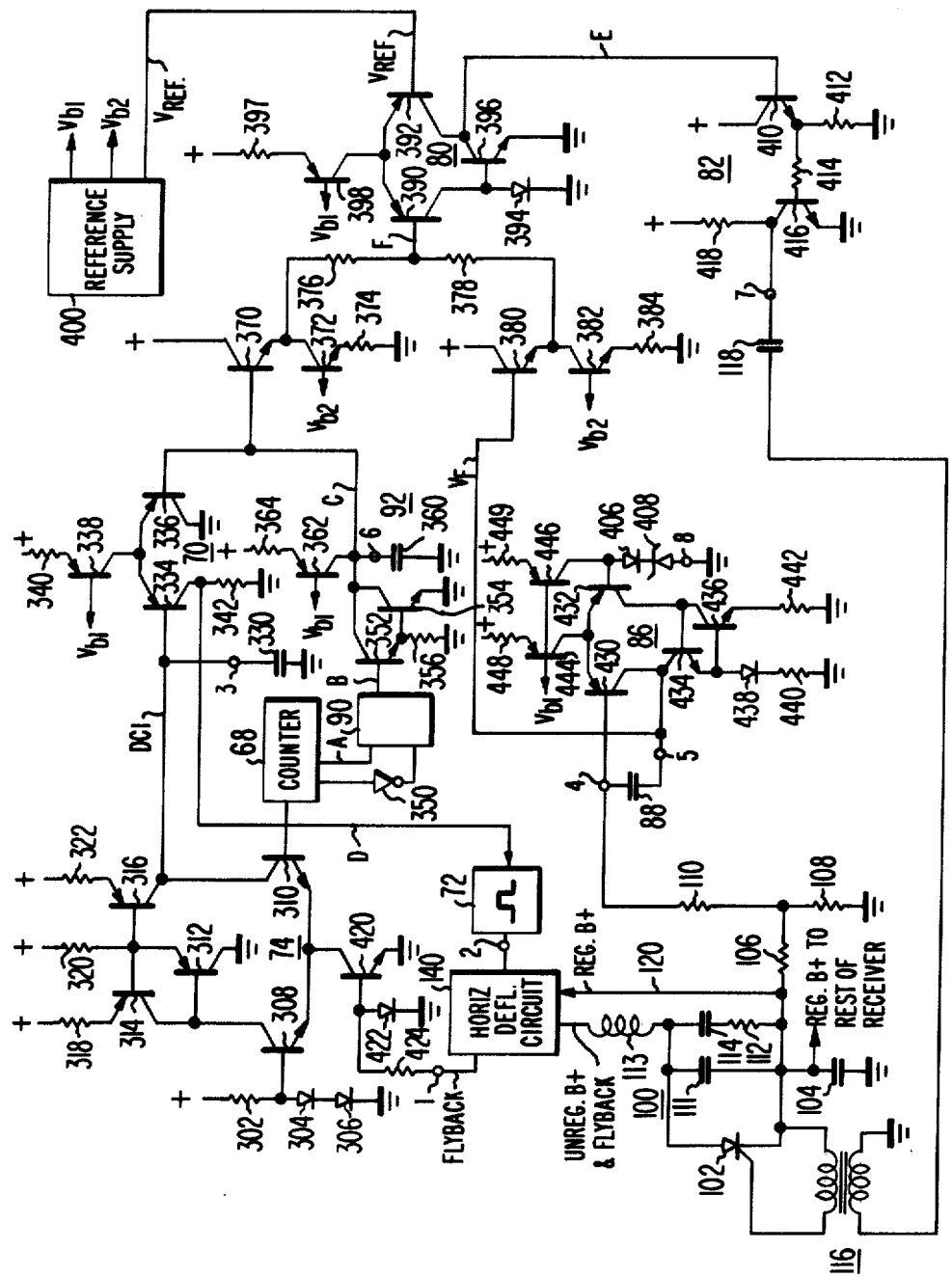
FIG. 3 illustrates, partially in block diagram form and partially in schematic diagram form, a more detailed embodiment of a horizontal deflection system and switched-mode power supply constructed in accordance with the principles of the present invention.

FIG. 1 illustrates the video signal processing portion of a television receiver containing a horizontal deflection system and a switched-mode power supply constructed in accordance with the principles of the present invention. Video signals are received by antenna 10 and applied to a tuner, intermediate frequency and video detector stage 12. The detected video signals are applied to luminance and chrominance processing circuitry 14, which supplies video drive signals to a kinescope 16. The detected video signals are also applied to a synchronizing signal separating circuit 18, which separates horizontal and vertical sync signals from the video information. The sync signals are coupled to a vertical deflection circuit 20, which generates vertical deflection signals for a deflection winding 22 located on the kinescope. The sync separator supplies horizontal sync signals to a phase detector 62.

The phase detector 62, a filter 64, a voltage controlled oscillator 66, and a counter 68 are coupled in a phase locked loop to develop output signals which are substantially free of noise and locked in phase and frequency to the incoming horizontal sync signals. Output signals from the counter 68 are applied to a second phase detector 74 and to a ramp generator 92 by way of a pulse shaper 90, the latter two components producing a sawtooth waveform at the horizontal sync pulse frequency. The phase detector 74 compares the horizontal sync locked pulses from the counter 68 with flyback pulses from a horizontal deflection circuit 140 and develops an output voltage which is filtered by a filter 76 and applied to one input of a comparator 70. The comparator 70 compares the filtered voltage with the sawtooth waveform developed by ramp generator 92 to determine the time at which a pulse generator 72 is to provide a drive signal to the horizontal deflection circuit 140. In response to the horizontal drive signals, the horizontal deflection circuit 140 develops deflection waveforms which are applied to deflection winding 142 and produces a high ultor voltage which is applied to the kinescope as a beam accelerating potential.

The sawtooth waveform developed by the ramp generator 92 is also applied to one input of a comparator 80 of a switched-mode power supply. A regulated B+ voltage produced by the power supply is divided down to a lower voltage level by resistors 106 and 108, which are coupled between a regulated B+ filter capacitor 104 and ground. The junction of the resistors 106 and 108 is coupled to one input of a comparator 86, the other input of which is coupled to receive a reference voltage from a source of reference voltage 84. The lower voltage derived from the regulated B+ voltage is compared with the reference voltage by the comparator 86 to develop an error voltage, which is filtered by a filter 88 and applied to the second input of comparator 80. The comparator 80 compares the filtered error voltage with the sawtooth waveform to develop a timed gating signal, which is amplified by an amplifier 82 and applied to the control electrode of an SCR or like device in a discrete regulator circuit 100. The discrete regulator circuit 100 receives an unregulated B+ voltage signal which contains a flyback component from the horizontal deflection circuit 140. The SCR device is gated on by the gating signal and remains regeneratively conductive until it is turned off by the reverse biasing effect of the flyback component. During the time that the SCR is conductive, current is supplied to the junction of the filter capacitor 104 and resistor 106 by the regulator circuit 100 to produce the regulated B+ voltage at that junction. The regulated B+ voltage developed by the discrete regulator circuit 100 is applied to the horizontal deflection circuit 140 as the supply voltage for that circuit, and to other areas of the television receiver. Regulation of the B+ voltage is achieved by the gated control of the duty cycle of the SCR device of the regulator circuit 100.

The operation of the systems of FIG. 1 may be understood by referring to the waveforms of FIG. 2. The phase locked loop circuit components 62, 64, 66, and 68 develop a signal A, as illustrated in FIG. 2a, which is maintained in a substantially constant phase and frequency relationship with the incoming horizontal sync signals. Signal A is applied to phase detector 74, and to pulse shaper 90, where its duty cycle is altered to produce the pulse sequence B of FIG. 2b. The pulse shaper 90 may, for example, be an astable multivibrator, or an arrangement of gated logic. The pulses B are then integrated by the ramp generator 92 to produce the sawtooth waveform C of FIG. 2c.

The comparator 70 compares the sawtooth waveform C with the voltage level DC 1, which is the filtered error voltage of the phase detector 74. When the positively increasing voltage represented by waveform C reaches the level of DC 1, as illustratively shown in FIG. 2c, the comparator output changes state, thereby producing the waveform D of FIG. 2d. It may be seen that the positive transition of waveform D at this time is delayed from the positive transition of the sync-locked waveform A by the period DL 1, shown in FIG. 2d. The positive transition of waveform D then triggers the pulse generator 72 to produce a horizontal drive signal, which is coupled to the horizontal deflection circuit 140. The pulse generator may be of the type described in U.S. patent application Ser. No. 102,575, filed Dec.

11, 1979 by the present inventors, entitled "PULSE GENERATOR FOR A HORIZONTAL DEFLECTION SYSTEM". The comparator 70 is therefore constantly responding to the phase difference between the sync derived and flyback pulses, and the sync pulse timing represented by the sawtooth waveform, to generate a horizontal drive signal timing waveform D which will effectively pull the flyback pulses, and hence the horizontal scanning interval, back into phase synchronism with the incoming horizontal sync signal. Undesirable effects, such as bends in the displayed television image, are thereby minimized.

The comparator 80 of the switched-mode power supply receives the sawtooth waveform C and a filtered error voltage DC 2 from the comparator 86, as represented in FIG. 2c. When the positively increasing voltage represented by waveform C reaches the level of DC 2, the output of comparator 80 changes state, thereby producing the waveform E of FIG. 2e. The positive transition of waveform E is delayed from the positive transition of the sync-locked waveform A by the period DL 2, shown in FIG. 2e. The period DL 2 is approximately equal to that portion of the duty cycle of the SCR of the regulator circuit 100 during which the device is nonconductive. The SCR device is conductive substantially during the positive-going portion of waveform E. Thus, it may be seen that the variation of delay DL 2 will vary the duty cycle of the SCR device, thereby controlling the regulation of the B+ voltage developed across the filter capacitor 104.

The SCR device of regulator circuit 100 is gated on by the positive transitions of waveform E, which is in a fixed timed relationship to the sync-locked signal A, from which the sawtooth waveform C is derived. The SCR device is rendered nonconductive by the flyback pulses, which may have a continuously varying phase relationship as compared to sync. Ideally, it would be desirable for the flyback pulses to turn off the SCR at the precise times of the negative transitions of waveform E, but the continuously varying times of occurrence of the flyback pulses prevents this. However, it has been found that, by operating the phase correction loop of the horizontal deflection system, including the phase detector 74, the filter 76, comparator 70, pulse generator 72, and the horizontal deflection circuit 140, at a higher speed than the power supply loop, the flyback pulses will be maintained in a satisfactorily constant phase relationship with the sync-locked waveform A so that the power supply is not adversely affected. This may be easily accomplished, for example, by adjusting the values of capacitive components in filters 76 and 88. Satisfactory operation of both the horizontal deflection system and the switched-mode power supply has been achieved by using a 7 KHz loop time constant for the phase correction loop, and a 400 Hz loop time constant for the power supply loop.

The use of only a single ramp generator 92 in the arrangement of FIG. 1 is especially advantageous when components of the horizontal deflection system and the switched-mode power supply are manufactured on a single integrated circuit chip. For instance, in the embodiment of FIG. 1, all of the components enclosed in the dashed box 50 have been manufactured on a single I.C. chip, with the exception of a few reactive elements of the filters, ramp generator, and pulse generator. The use of only one ramp generator conserves space on the chip and minimizes the number of pins required for connection to discrete circuit components. The interconnection between the ramp generator 92 and comparators 70 and 80 may be conveniently done on the integrated circuit chip itself, thereby permitting efficient combination of these two related television systems.

In FIG. 3, another embodiment of the ramp generator, phase correction loop, and switched mode power supply is shown in schematic detail. A counter 68 applies sync-locked pulses to the base of a transistor 310 of phase detector 74. Transistor 310 is coupled in a differential amplifier configuration by virtue of the coupling of its emitter to the emitter of a transistor 308 and to the collector of a transistor 420. A constant D.C. voltage is applied to the base of transistor 308 from a voltage divider, including the serial combination of a resistor 302 and diodes 304 and 306, coupled between a source of supply voltage (+) and a point of reference potential (ground). Transistor 420 renders the differential amplifier operational during the occurrence of flyback pulses, which are coupled to the base of transistor 420 from a horizontal deflection circuit 140 by way of an I.C. terminal 1 and a resistor 424. A diode 422 is coupled between the base of transistor 420 and ground, and the emitter of transistor 420 is coupled to ground.

A current mirror arrangement is coupled between the collectors of transistors 308 and 310. A transistor 314 has a collector coupled to the collector of transistor 308, an emitter coupled to the + supply by a resistor 318, and a base electrode. A transistor 312 has a base coupled to the collector of transistor 314, a collector coupled to ground, and an emitter coupled to the base of transistor 314 and to the + supply by a resistor 320. A transistor 316 has a base coupled to the base of transistor 314, an emitter coupled to the + supply by a resistor 322, and a collector coupled to the collector of transistor 310. An output signal, which corresponds to signal DC 1 in FIG. 2c, is applied to an I.C. terminal 3 and to the base of a transistor 334 of a comparator 70. A filter capacitor 330 is coupled between I.C. terminal 3 and ground.

The comparator 70 includes transistors 334 and 336, arranged in a differential amplifier configuration. The emitter of transistor 334 is coupled to the emitter of transistor 336, and to the collector of a current source transistor 338. The emitter of transistor 338 is coupled to the + supply by a resistor 340, and its base is coupled to a reference voltage $V_{b1}$ which is provided by a reference supply 400. The collector of transistor 336 is coupled to ground, and the collector of transistor 334 is coupled to a pulse generator 72 and to ground by a resistor 342. The pulse generator 72 provides horizontal drive pulses to the horizontal deflection circuit 140 by way of an I.C. terminal 2.

The counter 68 provides sync-locked pulses to a gated pulse shaper 90 and an inverter 350. Pulses of the waveform A, shown in FIG. 2a, are applied to the gated pulse shaper 90. The gated pulse shaper 90 produces output pulses B which are suitable to drive a ramp generator 92 and, in a preferred embodiment, waveform B has approximately a 1:7 duty cycle. The waveform B is applied to the base of a transistor 352, which has a collector coupled to the collector of a transistor 354 and to an I.C. output terminal 6, and an emitter coupled to the base of transistor 354 and to ground by a resistor 356. The emitter of transistor 354 is coupled to ground. The ramp generator is completed by a transistor 362, which has a collector coupled to I.C. terminal 6, a base coupled to the $V_{b1}$ reference voltage source, and an emitter coupled to the + supply by a resistor 364, and a capacitor 360 coupled between I.C. terminal 6 and ground.

In operation, a sawtooth waveform is developed at I.C. terminal 6 and is applied to the base of transistor 336 and to the base of a transistor 370. The collector of transistor 370 is coupled to the + supply, and its emitter is coupled to the collector of a transistor 372 and to the base of a transistor 390 by way of a resistor 376. Transistor 372 has an emitter coupled to ground by a resistor 374 and a base coupled to a reference voltage $V_{b2}$, which is supplied by the reference supply 400.

Transistor 390 is arranged in a differential amplifier configuration with a transistor 392 to form a comparator 80. The emitter of transistor 390 is coupled to the emitter of transistor 392, and to the collector of a current source transistor 398. The base of transistor 398 is coupled to the $V_{b1}$ reference voltage source, and its emitter is coupled to the + supply by a resistor 397. A reference voltage $V_{ref}$ is developed by the reference supply 400 and is applied to the base of transistor 392. A current mirror, including a diode 394 and a transistor 396, interconnects the collectors of transistors 390 and 392. The collector of transistor 390 is coupled to the anode of diode 394 and the base of transistor 396. The cathode of the diode 394 and the emitter of transistor 396 are coupled to ground. The collector of transistor 396 is coupled to the collector of transistor 392, and the signal developed at this junction is applied to the base of a transistor 410 of an output amplifier 82.

In the output amplifier 82, the collector of transistor 410 is coupled to the + supply, and its emitter is coupled to ground by a resistor 412, and to the base of a transistor 416 by a resistor 414. The emitter of transistor 416 is coupled to ground, and its collector is coupled to the + supply by a resistor 418 and to an I.C. terminal 7.

I.C. terminal 7 is coupled by way of a capacitor 118 to the primary winding of a transformer 116 of discrete regulator circuitry 100. The secondary of transformer 116 is coupled to the gate electrode of an SCR 102. Unregulated B+ voltage, containing a flyback signal component, is applied to the anode of the SCR 102 from the horizontal deflection circuit 140 by way of an inductor 113. A filter network, including the series combination of a capacitor 114 and a resistor 112, and a capacitor 111, is coupled in parallel with the SCR 102. The cathode of the SCR is coupled to the filter network and to one plate of a regulated B+ filter capacitor 104, the other plate of which is coupled to ground. The regulated B+ voltage developed at the cathode of the SCR 102 is coupled to the horizontal deflection circuit 140 by a conductor 120, and to a voltage divider, including resistors 106 and 108, which are coupled in parallel with the filter capacitor 104. A resistor 110 is coupled between an intermediate point of the voltage divider and an I.C. terminal 4.

A comparator 86 includes transistors 430 and 432, coupled in a differential amplifier configuration. The emitter of transistor 430 is coupled to the emitter of transistor 432 and to the collector of a current source transistor 444. The base of transistor 444 is coupled to the source of $V_{b1}$ reference voltage, and its emitter is coupled to the + supply by a resistor 448. The base of transistor 432 is biased by connection to the collector of a transistor 446 and to the anode of a diode 406. The base of transistor 446 is coupled to the source of $V_{b1}$ reference voltage, and its emitter is coupled to the + supply by a resistor 449. The cathode of diode 406 is coupled to the cathode of a zener diode 408, the anode of which is coupled to an I.C. terminal 8. In this embodiment, the I.C. terminal 8 is shown coupled to ground. The collector of transistor 430 is coupled to an I.C. terminal 5 and to the collector of a transistor 434. The emitter of transistor 434 is coupled to ground by the series combination of a diode 438 and a resistor 440, and is also coupled to the base of a transistor 436. The emitter of transistor 436 is coupled to ground by a resistor 442, and its collector is coupled to the base of transistor 434 and to the collector of transistor 432. A capacitor 88 is coupled between I.C. terminals 4 and 5.

The junction of the collectors of transistors 430 and 434 is coupled to the base of a transistor 380, the collector of which is coupled to the + supply. The emitter of transistor 380 is coupled to the collector of a transistor 382, and to the base of transistor 390 by way of a resistor 378. The base of transistor 382 is coupled to the source $V_{b2}$ reference voltage, and its emitter is coupled to ground by a resistor 384.

The counter 68 provides a horizontal sync-locked waveform to the phase detector 74 and to the pulse shaper 90. The gated pulse shaper 90 provides pulses of approximately an 8 microsecond duration to transistors 352 and 354, which conduct to discharge the capacitor 360 of the ramp generator. Between the conductive periods of transistors 352 and 354, the capacitor 360 is charged by transistor 362 to develop a sawtooth waveform on conductor C, which is applied to a comparator 70 and a transistor 370.

The horizontal sync-locked pulses which are applied to transistor 310 of the phase detector 74 are compared to a D.C. reference level at the base of transistor 308 during the occurrence of a flyback pulse at I.C. terminal 1, during which time emitter current is provided for transistors 308 and 310. The phase detector 74 produces a current, which is filtered and stored as voltage DC 1 across capacitor 330 and applied to the second input of comparator 70. When the upwardly ramping waveform at the base of transistor 336 exceeds the level of voltage DC 1, transistor 334 is rendered conductive and triggers pulse generator 72 by way of conductor D. The pulse generator 72 then produces a horizontal drive pulse, which is coupled to the horizontal deflection circuit 140 by way of I.C. terminal 2. It may be seen that this loop circuit, by comparing the phase of the flyback pulse to the horizontal sync locked pulse and varying the timing of the generation of the horizontal drive signal in response thereto, will maintain controlled phase synchronism between the incoming horizontal sync pulses and the horizontal deflection system flyback pulses. Phase errors between these two signals will be compensated for during each line of horizontal scanning in an amount determined by the time constant of the loop. The time constant of this loop circuit is adjusted by selecting the value of external capacitor 330, which is coupled to the loop circuit at I.C. terminal 3.

Simultaneously, pulse width modulated gating pulses are developed at I.C. terminal 7 by amplifier 82, and are used to gate on SCR device 102 of the external regulator circuit 100. An unregulated B+ voltage, which contains a flyback pulse component, is applied to the anode of the SCR 102 from the horizontal deflection circuit 100. When the SCR 102 is gated on, the B+ voltage is coupled to the regulated B+ filter capacitor 104 by the SCR 102, which remains regeneratively conductive until the negative flyback pulse turns the SCR 102 off. The filtered, regulated B+ voltage is applied to the horizontal deflection circuit 140 and to other circuitry in the television receiver. The regulated B+ voltage is also applied to a voltage divider 106, 108, and a portion of the divided voltage is coupled to the base of transistor 430 of comparator 86. Transistor 430 is arranged in a Miller integrator configuration in combination with capacitor 88, and also compares the regulated B+ voltage component with the D.C. voltage which is applied to the base of transistor 432. The D.C. voltage may be selected by applying a desired reference voltage to the anode of zener diode 408 at I.C. terminal 8; in the embodiment shown in FIG. 3, this terminal is grounded. The comparison of the regulated B+ voltage component with the D.C. reference voltage level results in the development of a voltage $V_F$, which is applied to the base of transistor 380. The time constant of the regulator circuit is controlled by selecting an appropriate value for capacitor 88.

The sawtooth waveform which appears at the base of transistor 370 is combined with the voltage $V_F$ by the connection of transistors 370 and 380 and resistors 376 and 378. The signal which is formed at the base of transistor 390 therefore comprises a sawtooth waveform which is reference to voltage $V_F$, the latter representing the deviation of the regulated B+ voltage from its desired level. The sawtooth waveform will thus move up and down with changes in voltage $V_F$ to indicate the correction required for the regulated B+ voltage. The signal F at the base of transistor 390 is shown in FIG. 2f, in timed relationship to the other signals in the system.

The sawtooth waveform at the base of transistor 390 is compared with the fixed reference voltage $V_{ref}$ which is applied to the base of transistor 392. When the upwardly ramping sawtooth waveform exceeds the level $V_{ref}$, transistor 392 is rendered conductive and a positive gating pulse is coupled to amplifier 82 by way of conductor E. It may be seen that, as the sawtooth waveform F rides up and down in consonance with changes in $V_F$, the timing of the gating pulse on conductor E changes accordingly. The width of the pulse on conductor E is thereby modulated to control the duty cycle of the SCR device 102. In this manner, regulation of the B+ voltage is achieved.

It may be seen that the arrangement of FIG. 3 results in an advantageous combination of the horizontal deflection and B+ regulation circuitry on a single I.C. chip, with only seven I.C. terminals needed for connection to the horizontal deflection circuit 140, the external regulator circuit 100, and capacitors 330, 360, and 88. Interconnection of the ramp generator 92, comparator 70, and comparator 80 are all conveniently made on the I.C. chip. Use of the common ramp generator for both the horizontal deflection system and the B+ regulation circuit is described herein has been found to result in the proper generation of horizontal drive signals and good regulation of the B+ voltage for a television receiver, as well as convenient packaging of portions of these systems in a single I.C. chip.

What is claimed is:

1. In a television receiver, including a deflection generator adapted to be synchronized with pulses produced by a source of synchronizing pulses, apparatus comprising:
    a ramp generator having an input coupled to said source of synchronizing pulses and an output for producing a sawtooth waveform;
    a phase detector having a first input coupled to said source of synchronizing pulses and a second input coupled to said deflection generator for receiving horizontal rate pulses therefrom for producing a first control signal in response to the frequency and phase difference between said synchronizing pulses and said horizontal rate pulses;
    a first comparator having a first input coupled to receive said first control signal and a second input coupled to receive said sawtooth waveform, and an output;
    means for coupling the output of said first comparator to said deflection generator for applying a horizontal drive signal thereto;
    a second comparator having a first input coupled to receive said sawtooth waveform, a second input, and an output for producing a gating signal;
    a regulator circuit, including a gated semiconductor device responsive to said gating signal, coupled to receive unregulated direct voltage from said deflection generator, for producing a regulated voltage;
    a source of reference voltage;
    a third comparator having a first input coupled to said reference voltage source and a second input responsive to said regulated voltage for producing a second control signal; and
    means for coupling said second control signal to said second input of said second comparator.

2. The television receiver of claim 1, further comprising:
    a first filter circuit having an input coupled to receive said first control signal and an output coupled to the first input of said first comparator; and wherein said means for coupling said second control signal to said second input of said second comparator comprises a second filter circuit.

3. The television receiver of claim 2, wherein said deflection generator, said phase detector, said first filter circuit, said first comparator and said first named coupling means comprise a first loop circuit having a time constant determined by said first filter circuit, and
    said second comparator, said regulator circuit, said third comparator, and said second filter circuit comprise a second loop circuit having a time constant determined by said second filter circuit,
    wherein the time constant of said second loop circuit is less than the time constant of said first loop circuit.

4. In a television receiver, including a horizontal deflection generator, apparatus comprising:
    a source of horizontal synchronizing signals;
    a ramp generator, including a capacitor which is alternately charged and discharged in response to signals from said horizontal synchronizing signal source, for producing a sawtooth waveform;
    means, having an input coupled to said source of horizontal synchronizing signals and an output coupled to said horizontal deflection generator, for producing drive signals for said horizontal deflection generator, said means including means coupled to said ramp generator for controlling the production of said drive signals in timed relation to said sawtooth waveform;
    a source of unregulated direct voltage; and
    a regulator circuit, including a switching device responsive to a gating signal and coupled to said source of unregulated direct voltage, for producing a regulated direct voltage, and including means coupled to said ramp generator and responsive to said regulated direct voltage level for producing said gating signal in timed relation to said sawtooth waveform, wherein said horizontal synchronizing signal source, said ramp generator, said drive signal production controlling means, and said gating signal producing means are located on a single integrated circuit chip, and said horizontal deflection generator, said capacitor, said source of unregulated direct voltage, and said switching device are located external to said chip.

5. A television receiver, including a horizontal deflection circuit for producing horizontal deflection signals, a flyback signal and an unregulated direct voltage; and a source of horizontal synchronizing signals; a horizontal drive signal circuit comprising:

a first loop circuit having an input coupled to said source of horizontal synchronizing signals and an output for producing pulses in a substantially constant phase and frequency relationship to said horizontal synchronizing signals;

means having an input coupled to the output of said first loop circuit and an output for producing a sawtooth waveform in timed relation to said pulses produced by said first loop circuit;

a second loop circuit, including a first input responsive to pulses produced by said first loop circuit, a second input responsive to said flyback signal, and an output coupled to said horizontal deflection circuit for applying drive signals thereto, and further including a third input responsive to said sawtooth waveform for controlling the generation of said drive signals in timed relation thereto; and a regulator circuit, including a gated switching device having a gate signal input, an input coupled to receive said unregulated direct voltage, and an output for producing a regulated direct voltage; means responsive to said regulated direct voltage and a reference voltage for developing an error signal; and means having a first input responsive to said error signal, a second input responsive to said sawtooth waveform, and an output coupled to said gate signal input for producing a gating signal at said output in timed relation to said sawtooth waveform.

6. A television receiver, including a horizontal deflection circuit for producing horizontal deflection signals and a flyback signal; and a source of horizontal synchronizing signals; apparatus comprising:

means having an input coupled to said source of horizontal synchronizing signals and an output for producing a sawtooth waveform in time relation to said horizontal synchronizing signals;

a loop circuit, including a first input responsive to pulses produced by said source of horizontal synchronizing signals, a second input responsive to said flyback signal, and an output coupled to said horizontal deflection circuit for applying drive signals thereto, and further including a third input responsive to said sawtooth waveform for controlling the generation of said drive signals in time relation thereto;

a source of unregulated direct voltage;

a regulator circuit, including a switching device responsive to a gating signal and coupled to said source of unregulated direct voltage, for producing a regulated direct voltage;

a first comparator, having an input responsive to said regulated direct voltage, for comparing said regulated direct voltage to a first reference voltage so as to produce, at an output, an error voltage;

means, having a first input responsive to said sawtooth waveform and a second input responsive to said error voltage, for combining said sawtooth waveform and said error voltage;

a second comparator, having an input responsive to said combined sawtooth waveform and error voltage, for comparing said combined signals to a second reference voltage so as to produce, at an output, a gating signal in timed relation to said sawtooth waveform, and means for coupling the output of said second comparator to said switching device.

7. The television receiver of claim 6, wherein said switching device is a silicon controlled rectifier and said source of unregulated direct voltage supplies an unregulated direct voltage signal to said regulator circuit which includes a flyback signal component, and said flyback signal component is effective to switch said silicon controlled rectifier into a nonconducting state.

8. The television receiver of claim 7, wherein said first comparator includes two transistors coupled in a differential amplifier configuration, and a capacitor coupled between the base and collector electrodes of one of said transistors.

9. The television receiver of claim 8, wherein said regulator circuit, said first comparator, said combining means, said second comparator, and said coupling means comprises a switched-mode power supply loop circuit and the time constant of said power supply loop circuit is dependent upon the value of said capacitor.

10. The television receiver of claim 9, wherein said horizontal drive signal loop circuit further includes a filter circuit for determining the time constant of said horizontal drive signal loop circuit, and wherein the time constant of said power supply loop circuit is less than the time constant of said horizontal drive signal loop circuit.

* * * * *